United States Patent Office 3,496,136
Patented Feb. 17, 1970

3,496,136
COMBINATIONS OF UV ABSORBERS AND MELAMINE DERIVATIVES AS STABILIZERS FOR CERTAIN RIGID THERMOPLASTIC RESINS
Peter Vincent Susi, Middlesex, and Joseph Anthony Stretanski, Somerville, N.J., assignors to American Cyanamid Company, Stamford, Conn., a corporation of Maine
No Drawing. Continuation-in-part of application Ser. No. 553,704, May 31, 1966, which is a continuation-in-part of application Ser. No. 498,112, Oct. 19, 1965. This application Dec. 30, 1968, Ser. No. 788,043
Int. Cl. C08f 45/58
U.S. Cl. 260—45.8         10 Claims

ABSTRACT OF THE DISCLOSURE

The stabilization of rigid poly(vinyl chloride) and polystyrene by incorporation therein of a stabilizer comprising (a) a substituted melamine and (b) an ultraviolet light absorber, each of (a) and (b) being present in a concentration of 0.1 to 5.0 based on the weight of the thermoplastic resin.

---

This application is a continuation-in-part of application No. 553,704, filed May 31, 1966, now abandoned, which was, in turn, a continuation-in-part of application Ser. No. 498,112, filed Oct. 19, 1965 and now abandoned.

This invention relates to the stabilization of certain thermoplastic resinous compositions against degradation by light and, in the preferred embodiments against degradation by heat also. It relates further to the resulting stabilized polymeric compositions.

By the terms "rigid poly(vinyl chloride)" and "rigid polystyrene" as employed herein is meant a vinyl chloride or styrene polymer composition having no significant amount of plasticizer. The term "rigid" is used in opposition to the term "flexible" which is applied to such polymers containing significant amounts of plasticizer. For convenience, the poly(vinyl chloride) resin will be referred to hereinafter by the abbreviation "PVC."

The sensitivity to both light and heat of PVC and polystyrene compositions has been recognized and, to some extent, dealt with by incorporating in the polymeric compositions to be stabilized effective amounts of heat stabilizers and/or light stabilizers. Recently, an advance was made by the use, in combination, of members of a specific class of heat stabilizers, along with members of a specific class of light stabilizers. Thus, in U.S. Patent 2,912,411, there is disclosed a means of stabilizing PVC compositions by incorporation of a phosphorous amide (as a light stabilizer) in addition to a conventional heat stabilizer (e.g., sodium carbonate, cadmium ricinoleate, or an organic epoxy hydrochlorophyl). While there is no definite statement in the patent that the PVC must be of the plasticized type, the fact is that only plasticized PVC is used in the examples, and an attempt to use the stabilizer of the patent on rigid PVC proves to be rather discouraging. Rigid PVC (i.e., PVC without plasticizer) is made only slightly more stable with the stabilizer of the patent than the control sample of PVC without any stabilizer. This can be seen from the following table.

TABLE.—RIGID PVC

| Additive | | |
|---|---|---|
| Name | Conc. (weight) percent | UV exposure (hours) for $\Delta$Y.I.=15 |
| Control | | (2) |
| Organo-tin-mercaptide (Thermolite 31)[1] | 2 | 130 |
| Organo-tin-mercaptide (Thermolite 31) and Hexamethylphosphoric triamide | 2<br>0.5 | 185 |

[1] A commercially available di-n-butyl tin bis(isooctyl mercapto acetate).
[2] Degrades on mill.

This light stabilizer, found to be effective for plasticized PVC, is of only doubtful use for rigid PVC.

In view of this state of the art, it is a general object of this invention to provide a stabilizer for certain rigid thermoplastic resins (such as rigid PVC and rigid polystyrene) which is capable of making them stable to the effects of light during the life of the shaped articles which are prepared therefrom when used either alone or in the presence of a heat stabilizer. It is a further specific object to provide such compositions containing effective amounts of such a stabilizer. Other objects will become apparent upon reading the following detailed description of the invention.

The foregoing objects are acocmplished herein with great effectiveness in a surprisingly simple manner. In accordance with the present invention, certain thermoplastic resins such as rigid PVC or polystyrene, whether or not they contain a conventional heat stabilizer such as is commonly employed to protect them through high temperature processing, are made stable to light by use of a light stabilizer comprising a substituted melamine and an ultraviolet light absorber. When such a stabilizer is used in an effective amount (for example, about 0.2% to about 6.0% based on the weight of resin), the said resin is able to withstand the degrading effects of light for long periods; much longer than could be expected from the known effectiveness of either the substituted melamine or the ultraviolet light absorber per se. This is quite surprising since the melamine compound by itself is hardly capable of adding any stability to such rigid thermoplastic resins, and it could not be expected that it would exercise a stabilizing function if used in conjunction with a UV absorber. It is noteworthy that levels of stability are attainable through the present invention which could not be reached by use of a UV absorber per se, even by doubling concentration levels. Up to a certain point, increasing concentrations of UV absorber are accompanied by increased polymer stability. Beyond this point, increasing the concentration of the UV absorber gives no beneficial effect, and sometimes may even reduce a polymer stability. Because of this "peaking out" characteristic, it is not possible to obtain levels of stability beyond a certain point simply by increasing concentration of the stabilizer. The problem is much more complex and the solution less evident. It is therefore a very significant accomplishment to improve the stability of rigid thermoplastic resins such as PVC and polystyrene beyond the levels which are attainable by conventional use of previously available additives.

The melamines which are useful in accordance with the present invention are represented by the following Formula I:

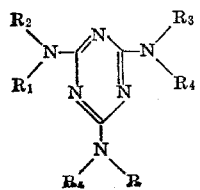

wherein each $R_1$ is alkyl of 1–18 carbons, alkenyl of 2–18 carbons (e.g., acrylyl, methacrylyl and oleyl), aryl of 1–2 six-membered rings, carbalkoxyalkyl of up to 18 carbons, carboxyalkyl of up to 18 carbons, alkanamidoalkyl of up to 18 carbons, alkanoyloxyalkyl of up to 18 carbons, hydroxy-lower alkyl, lower alkoxy(lower alkyl) or cyano-lower alkyl; $R_2$, $R_3$, $R_4$, $R_5$, and $R_6$ are each hydrogen or $R_1$; or, together, $R_1$ and $R_2$ or $R_3$ and $R_4$ or $R_5$ and $R_6$ can form a pyrrolidino, morpholino, piperidino or a piperazino ring. Examples of compounds which may be used are the following: N,N-diallylmelamine; N,N′,N″-tri-n-butyl - melamine; N,N - diethylmelamine; 2,4 - dimethylamino - 6 - morpholinyl-s-triazine; bis(stearamidomethyl)-tris(methoxymethyl)melamine; N-methylmelamine; N-methylmelamine; N,N′-dimethylmelamine; N,N′,N″-tris(carbomethoxymethyl)melamine; N,N′,N″-tris(2-cyanoethyl)melamine; N - (2 - hydroxyethyl)-N′,N″-didodecylmelamine; N,N′ - bis(2 - hydroxyethyl)-N″-dodecylmelamine; 2,4,6-tris(1-piperidyl)-s-triazine; 2,4-bis(methylamino)-6-(1-pyrrolidyl)-s-triazine; 2,4-bis(dimethylamino) - 6 - (1-piperidyl)-s-triazine; N-stearoyloxymethyl - N,N′,N′,N″, N″ - pentamethoxymethylmelamine; N,N′,N″ - triphenylmelamine; and N,N-dimethylmelamine.

The UV light absorbers which form the other component of the stabilizer of the present invention are well-known. Generally such ultraviolet light absorbers are of either the 2 - hydroxybenzophenone, the 2 - (2 - hydroxyphenyl)benzotriazole, the aromatic carboxylic ester, the tri(hydroxyaryl)triazine, the benzothiazoline, the benzylidene-malonic ester or the anilinomethylene-malononitrile type. Others may be employed as long as they are compatible with the resin and have the effect of performing the normal UV absorber function. It has been observed that the desirable enhancement of UV absorber activity by conjoint use with a melamine of Formula I is not dependent on the chemical structure of the absorber, but upon the physical attributes of compatibility and UV absorption which permit it to protect the resin. Thus, a wide variety of chemically dissimilar UV absorbers for rigid PVC and polystyrene can be used in the practice of this invention.

Examples of ultraviolet absorbers which may be used are as follows:

(A) 2-hydroxybenzophenones.—2-hydroxy-4-methoxybenzophenone, 2,4 - dihydroxybenzophenone, 2,2′ - dihydroxy - 4 - methoxybenzophenone, 2,2′,4,4′ - tetrahydroxybenzophenone, 2,2′ - dihydroxy-4,4′-dimethoxybenzophenone, 2 - hydroxy - 4 - butoxybenzophenone, 2-hydroxy-4-octyloxybenzophenone, 2-hydroxy-4-dodecyloxybenzophenone, 2,2′-dihydroxy-4-octyloxybenzophenone, 4′-chloro-2-hydroxy-4-octyloxybenzophenone, etc.

(B) Benzotriazoles.—2-(2-hydroxy - 5 - methylphenyl)benzotriazole, 2-(2-hydroxy-5-octylphenyl)benzotriazole, 2-(2-hydroxy-4-methoxyphenyl)benzotriazole, etc.

(C) Esters.—Phenyl salicylate, tertiary-butylphenyl salicylate, phenyl resorcylate, p-octylphenyl benzoate, bis (p - nonylphenyl)isophthalate, bis(p-nonylphenyl)terephthalate, etc.

(D) Triazines.—2,4,6 - tris(2-hydroxy-4-octyloxyphenyl) - s - triazine, 2 - (2 - hydroxy - 4 - octyloxyphenyl)-4,6-dixylyl-s-triazine, etc. These compounds are the subject of U.S. Patent No. 3,118,887, issued Jan. 21, 1964, to Hardy et al.

(E) Benzothiazolines.—2-(4-methoxyphenylimino)-3-ethylbenzothiazoline, 2 - phenylimino-3-ethylbenzothiazoline, etc. These materials are disclosed in U.S. Patent 2,393,801.

(F) Benzylidene-malonic esters.—Diethyl p-methoxybenzylidenemalonate, diethyl o-methoxybenzylidenemalonate, diethyl p-hydroxybenzylidenemalonate, diethyl diphenylmethylenemalonate, etc. This class of ultraviolet absorbers is disclosed in copending application of Susi, Ser. No. 362,182, filed Apr. 23, 1964.

(G) Arylaminoethylenes.—N-methyl - p - methoxyanilinomethylenemalononitriles disclosed in U.S. Patent No. 3,079,366.

(H) Guanidines of the 1,2-dibenzoyl-3-arylguanidine class (disclosed in application Ser. No. 386,386, filed July 30, 1964) as exemplified by 1,2-dibenzoyl-3-(p-methoxyphenyl)guanidine, 1,2 - dibenzoyl-3-(p-chlorophenyl)guanidine, 1,2-di-(p - methoxybenzoyl)-3-(p-methoxyphenyl) guanidine, and the like.

(I) Aryl acrylonitrile and arylacrylic acid derivatives such as: Diphenylmethylene-cyanoacetic acid ethyl ester; diphenylmethylene-cyanoacetic acid octyl ester, and diphenylmethylene-malononitrile. These are disclosed in U.S. Patents 3,111,417; 3,149,146; and 3,085,097.

The amount of ultraviolet absorber should be between 0.1 and 3.0%, preferably between 0.2 and 1.0% based on the weight of the resin. The amount of the melamine compound should be between 0.1 and 5.0%, preferably between 0.5 and 3.0%, based on the weight of the resin. As will be noted, the melamine compound concentration can be equal to, or preferably greater than the concentration of the ultraviolet absorber.

Combining the melamine and the UV absorber results in a light stabilizing system having two components.

Since the melamine component by itself provides very little added stability to rigid PVC, or polystyrene, it is indeed surprising that the same component along with a UV absorber provides a degree of stability which was not attainable with either component alone.

It should be noted that the invention also contemplates, in its preferred embodiments, the stabilization of PVC or other rigid thermoplastic resins against degradation by both heat and light such as might be encountered during normal usage of articles manufactured therefrom. Other heat stabilizers may be necessary to prevent these resins from being degraded by high temperatures required for milling, molding and compounding the resin if such are utilized. The heat stabilizers which are useful for this purpose can be any of the conventionally available types. While rigid PVC, for example, is always processed commercially in the presence of a heat stabilizer and the same types are useful herein in normally effective amounts, use of such heat stabilizers are not necessary to obtain the benefits of this invention. Most heat stabilizers are organo-metallic compounds. However, inorganic compounds such as sodium carbonate are also useful. Among the heat stabilizing organo-metallic compounds are the organo-tin compounds (dibutyl tin dimaleate, dibutyl tin dilaurate, dibutyl tin thioglycolic acid octyl ester, di-n-butyl tin bis (isooctyl mercapto acetate)); the cadmium or barium salts (barium stearate, cadmium stearate, barium ricinoleate, cadmium riconleate, barium octylphenolate); and the organic hydrochlorophyl (acid acceptor) of the epoxy type (epoxidized soybean oil, methyl epoxystearates). A more complete listing of such heat stabilizers is disclosed in Chevassus et al., The Stabilization of Polyvinyl Chloride, Arnold Publ. Ltd., London (1963), pp. 343–374.

When used with a heat stabilizer, the light stabilizer of the present invention may be added as a whole to the rigid thermoplastic resin or the components may be added separately. Generally, the heat stabilizer is the first to be put into the resin, and the light stabilizers are then incorporated into this blend by conventional milling procedures. After thorough blending, the rigid thermoplastic resin can then be shaped into a film or other article of manufacture by compression-molding, extrusion, injection-molding, calendering, etc.

Other additives may be employed to modify the rigid thermoplastic resin for the intended application. Among such additives are fillers, antistatic agents, pigments (including $TiO_2$), dyes, lubricants, etc.

The present invention is further illustrated by the examples which follow, wherein the various additives employed are identified as follows:

Ultraviolet absorbers (A) 2-hydroxy-4-methoxybenzophenone
(B) 2-(2-hydroxy-5-methylphenyl)benzotriazole
(C) p-Methoxybenzylidenemalonic acid, diethyl ester Melamines (1) N-allylmelamine
(2) N-methylmelamine
(3) N,N'-dimethylmelamine
(4) N,N',N''-triphenylmelamine
(5) N,N-dimethylmelamine
(6) N,N',N''-tri-n-butylmelamine
(7) N,N-diallylmelamine
(8) N-(2-hydroxyethyl)-N',N''-didodecylmelamine
(9) N,N'-bis(2-hydroxyethyl)-N''-dodecylmelamine
(10) Bis(stearamidomethyl)-tris(methoxymethyl) melamine
(11) 2,4-dimethylamino-6-(4-morpholinyl)-s-triazine
(12) 2,4,6-tris(1-piperidyl)-s-triazine
(13) 2,4-bis(dimethylamino)-6(1-pyrrolidyl)-s-triazine
(14) 2,4-bis(dimethylamino)-6-(1-piperidyl)-s-triazine
(15) N-stearoyloxymethyl-N,N',N',N'',N''-pentamethoxymethylmelamine
(16) Hexamethylmelamine

EXAMPLE 1

Effectiveness of the combinations of various melamines and UV absorbers was determined by preparation of suitable polymeric structures containing them and exposing such structures to ultraviolet and other forms of light as exemplified by a Flourescent Sunlamp-Blacklight Unit. Yellow Index determinations were made with the use of a differential colorimeter (Colormaster). The results are reported as the number of hours to reach a change in Yellow Index ($\Delta YI$) of 15 units.

Samples for exposure were prepared by weighing the additives into 100-gram quantities of the masterbatch and roll-blending these samples overnight. The mixture was then placed on a roll mill and mixed for five minutes at 165° C. The samples were finally fabricated by compression-molding at 175° C.

In this example, the various additives were employed singly to show the relative contribution to light stability of the separate ingredients. Each additive was employed at 0.5% based on the weight of poly(vinyl chloride). Results are given in Table I.

The results show that UV absorbers improve light stability of rigid poly(vinyl chloride) to some extent and such improvement varies somewhat among UV absorber types. The results further show that the various melamines alone are ineffective as light stabilizers for rigid poly(vinyl chloride).

In similar experiments, it is readily shown that other UV absorbers effect some improvements in light stability of rigid poly(vinyl cloride) and that other melamine derivatives are ineffective.

TABLE I.—FS-BL EXPOSURE OF PVC

| | Additive [1] | Initial YI | Time (hrs.) for $\Delta$ YI=15 | Improvement [2] (hrs.) |
|---|---|---|---|---|
| Test Number: | | | | |
| 1 | None | 3 | 160 | ([3]) |
| 2 | A | 2 | 570 | 410 |
| 3 | B | 3 | 580 | 420 |
| 4 | C | 3 | 440 | 280 |
| 5 | 1 | 6 | 150 | 0 |
| 6 | 2 | 4 | 140 | 0 |
| 7 | 3 | 4 | 140 | 0 |
| 8 | 4 | 4 | 140 | 0 |
| 9 | 5 | 4 | 130 | 0 |
| 10 | 6 | 5 | 130 | 0 |

[1] In addition to heat stabilizers.
[2] In time for $\Delta YI=15$.
[3] Standard.

EXAMPLE 2

In this example, the various combinations were employed in rigid poly(vinyl chloride) following the procedure of Example 1. The additives were employed at a concentration of 0.5% each based on the weight of poly(vinyl chloride). Results are given in Table II.

The results show that the combination of the various melamines and UV absorber gives far more stability than obtained from the UV absorber alone and far more than would be expected from such combination since the various melamines alone are ineffective.

TABLE II.—FS-BL EXPOSURE OF PVC

| | Additive [1] | Initial YI | Time (hrs.) for $\Delta YI=15$ | Improvement (hrs.) [2] | Expected improvement (hrs.) [3] |
|---|---|---|---|---|---|
| Test number: | | | | | |
| 1 | A plus 1 | 5 | 1,020 | 860 | 410 |
| 2 | B plus 1 | 6 | 1,210 | 1,050 | 420 |
| 3 | C plus 1 | 5 | 660 | 500 | 280 |
| 4 | A plus 7 | 4 | 880 | 720 | 410 |
| 5 | A plus 8 | 5 | 920 | 760 | 410 |
| 6 | A plus 9 | 4 | 840 | 680 | 410 |
| 7 | A plus 16 | 4 | 1,260 | 1,100 | 410 |

[1] In addition to heat stabilizers.
[2] Over control as in Example 1.
[3] Based on use of UV absorber alone since melamines alone contributed nothing.

Sample preparation

The samples were prepared from the following masterbatch formulation:

| | Parts |
|---|---|
| PVC | 100 |
| Dibutyl tin dithioglycolic acid, dioctyl ester heat stabilizer | 2.0 |
| Stearic acid | 0.5 |

EXAMPLE 3

The procedure of Example 2 was repeated identically but, since exposures were made during a different time period, exposure data on controls was again obtained. The results obtained are given in Table III.

The results again show the advantages of the combinations of the various melamines and UV absorber over the UV absorber alone in spite of the ineffectiveness of the various melamines alone.

TABLE III.—FS-BL EXPOSURE OF PVC

| Additive [1] | Initial YI | Time (hrs.) for $\Delta YI=15$ | Improvement (hrs.) [2] | Expected improvement (hrs.) [3] |
|---|---|---|---|---|
| Test number: | | | | |
| 1 — None | 3 | 160 | | Control |
| 2 — A alone | 3 | 340 | 180 | |
| 3 — A plus 3 | 5 | 900 | 740 | 180 |
| 4 — A plus 4 | 5 | 690 | 530 | 180 |
| 5 — A plus 5 | 4 | 510 | 350 | 180 |
| 6 — A plus 6 | 4 | 590 | 430 | 180 |
| 7 — A plus 2 | 4 | 490 | 330 | 180 |
| 8 — A plus 10 | 5 | 690 | 530 | 180 |
| 9 — A plus 11 | 3 | 660 | 500 | 180 |
| 10 — A plus 12 | 4 | 740 | 580 | 180 |
| 11 — A plus 13 | 3 | 820 | 660 | 180 |
| 12 — A plus 14 | 3 | 780 | 620 | 180 |

[1] In addition to heat stabilizers.
[2] Over control.
[3] Based on use of UV absorber alone since melamines alone contributed nothing.

EXAMPLE 4

The following additive combinations were incorporated into rigid PVC at 0.5% each as in Example 1 and the polymer samples were exposed to outdoor Florida weathering. Results given in Table IV show the synergistic properties afforded by the combination of Additive A and various melamines.

TABLE IV.—OUTDOOR EXPOSURE OF PVC

| Additive | Initial YI | Florida exposure $\Delta YI$ at six months |
|---|---|---|
| Test number: | | |
| 1 — Control | 3 | 28 |
| 2 — A | 2 | 6 |
| 3 — A plus 7 | 4 | 2 |
| 4 — A plus 1 | 5 | −1 |
| 5 — A plus 9 | 4 | 2 |

EXAMPLE 5

The effectiveness of the combinations of various U.V. absorbers and melamine in polystyrene was determined by preparation of suitable polymeric films containing about 0.25% by weight of resin stabilized of the various additive components which have been found to protect the polystyrene. Reflectance curves were taken on a General Electric Recording Spectrophotometer and the Yellow Factor (YF) of each calculated using the formula:

$$YF = \frac{\%R_{680} - \%R_{420}}{\%R_{550}(\text{initial})} \times 100$$

wherein the R's refer to the reflectances at the wavelengths indicated by the subscripts. The results of each test are reported as change in yellow factor at 400 hours and 1400 hours in the Fade-Ometer.

Samples for exposure were prepared by weighing the additives into 100-gram quantities of polystyrene and roll-blending these samples overnight. The mixture was then placed on a roll mill and mixed for five minutes at 165° C. The samples were finally fabricated by compression-molding at 175° C. This practice is more particularly shown in U.S. Patent 3,134,751 which is incorporated herein.

In this example, the various additives were employed singly to show the relative contribution to light stability of the separate ingredients. Each additive was employed at 0.25% based on the weight of poly(styrene). Results are given in Table V above:

TABLE V.—EXPOSURE DATA OF POLYSTYRENE

| Additive | Initial YF | YF after 400 hours | YF after 1,400 hours |
|---|---|---|---|
| Test Number: | | | |
| 1 — None | 5 | [1] 10 | |
| 2 — B | 10 | 6 | 36 |
| 3 — B plus $A_1$ | 9 | 4 | 18 |
| 4 — B plus $A_2$ | 9 | 4 | 19 |
| 5 — B plus $A_3$ | 10 | 4 | 20 |
| 6 — B plus $A_4$ | 9 | 5 | 22 |
| 7 — B plus $A_5$ | 7 | 6 | 26 |
| 8 — B plus $A_6$ | 9 | 7 | 28 |
| 9 — $A_1$ | 4 | 15 | |
| 10 — $A_2$ | 5 | 15 | |
| 11 — $A_3$ | 7 | [2] 14 | |
| 12 — $A_4$ | 6 | [3] 10 | |
| 13 — $A_5$ | 5 | 16 | |
| 14 — $A_6$ | 5 | 17 | |

[1] 25 at 800 hours.  [2] 18 at 600 hours.  [3] 16 at 800 hours.

IDENTIFICATION OF TEST ADDITIVES

B = 2-hydroxy-4-methoxybenzophenone

A Series Melamines $$\begin{array}{c} R_1-C \overset{N}{\underset{N}{\diagup}} C-R_2 \\ \underset{C}{\overset{N}{\diagdown}} \\ R_3 \end{array}$$

$A_1$  $R_1 = -N(CH_3)_2 = R_2$; $R_3 = -N\!\!\bigcirc\!\!O$ $A_2$  $R_1 = NH_2$, $R_2 = N(CH_3)$, $R_3 = -NH(CH_3)$
$A_3$  $R_1 = NH_2$, $R_2 = NH_2$, $R_3 = NH(CH_2CH=CH_2)$
$A_4$  $R_1 = NH_2$, $R_2 = NH_2$, $R_3 = NH(CH_2CH=CH_2)_2$ $A_5$  $R_1 = -N(CH_3)_2$, $R_2 = -N(CH_3)_2$, $R_3 = -N\!\!\bigcirc$ $A_6$  $R_1 - NH-\bigcirc$    $R_2 = NH-\bigcirc$ $R_3 = -NH-\bigcirc$ From the test data shown above in Table V it can be seen that the combinations of ultraviolet absorber (B) and melamine component (A) give light stability to polystyrene that is superior to that obtained with either A or B separately. In this table while the only ultraviolet light absorber shown is 2-hydroxy-4-methoxybenzophenone, similar results are found with other like materials and this data is merely submitted to illustrate the concept involved.

EXAMPLE 6

Five PVC films were prepared without any heat stabilizer present. One film was utilized as a control and had no additive present. A second film contained 1.0% of Additive 16 (hexamethylmelamine). The third and fourth film contained 0.5% and 1.0%, respectively, of Additive B (2-hydroxy-4-methoxybenzophenone). The fifth film (in accordance with the present invention) contained 0.5% of Additive 16 plus 0.5% of Additive B.

Each film was compression molded directly from the homopolymer powder (after dry blending a portion of the powder with the appropriate additive or additives when used). The five films were then exposed to ultraviolet light using a Fluorescent Sunlamp-Blacklight (FS–BL) lamp for 75 hours and the change in yellow index was measured using differential colorimeter (Colormaster), as in Example 1. The results are shown below in Table VI.

TABLE VI

| Description | Initial YI | YI on exposure Δ for 75 hours |
|---|---|---|
| Control, no additive | 4+ | 36 |
| PVC plus 1.0% additive 16 | 4 | 38 |
| PVC plus 0.5% additive B | 4 | 15 |
| PVC plus 1.0% additive B | 4 | 6+ |
| PVC plus 0.5% additive 16 plus 0.5% additive B | 3+ | 3 |

This example shows that, in the absence of a heat stabilizer, the melamine alone produced no light stabilizing effect but that, when used in combination with an ultraviolet light absorber the greatly enhanced light stabilizing effect of the present invention was obtained.

In total, these examples clearly demonstrate the beneficial light stabilizing effect of the stabilizer combinations of the present invention in rigid PVC and polystyrene in the presence of and in the absence of heat stabilizers.

We claim:
1. A rigid thermoplastic resin selected from the group consisting of poly(vinyl chloride) and polystyrene stabilized against the deteriorating effects of light by having incorporated therein a stabilizer comprising the following materials:
(a) a melamine having the formula:

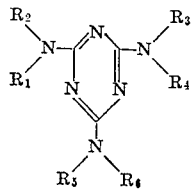

wherein $R_1$ is either alkyl of 1–18 carbons, alkenyl of 2–18 carbons, carboxyalkyl of up to 18 carbons, carbalkoxyalkyl of up to 18 carbons, alkanoyloxyalkyl of up to 18 carbons, alkanamidoalkyl of up to 18 carbons, hydroxy(lower alkyl), lower alkoxy(lower alkyl), cyano(lower alkyl); $R_2$, $R_3$, $R_4$, $R_5$ and $R_6$ are individually $R_1$ or hydrogen; or together $R_1$ and $R_2$ or $R_3$ and $R_4$ or $R_5$ and $R_6$ can form pyrrolidino, morpholino, piperidino or piperazino ring;
(b) an ultraviolet absorber which is compatable with said thermoplastic resin and is per se capable of imparting light stability thereto; each of said materials being present in concentrations of 0.1 to 5.0%, based on the weight of the rigid thermoplastic resin.

2. A rigid poly(vinyl chloride) composition in accordance with claim 1 having an effective amount of a heat stabilizer.

3. A composition as defined in claim 1 wherein said ultraviolet absorber is selected from the group consisting of 2-hydroxybenzophenones, 2-(2-hydroxyphenyl)-benzotriazoles, phenyl salicylates, 2,4,6-tris(2-hydroxyphenyl)-s-trizines, 2-phenyliminobenzothiazoline, arylaminoethylenes, benzylidenemalonic esters, diaryl methylenemalonitriles and 1,2-dibenzoyl-3-arylguanidines.

4. Rigid polystyrene according to claim 1 stabilized against the deteriorating effects of light by having incorporated therein between 0.1 and 5.0% of both N,N',N''-tri-n-butyl-melamine and 2-hydroxy-4-methoxybenzophenone.

5. Rigid poly(vinyl chloride) of claim 1 stabilized against the deteriorating effects of light by having incorporated therein between 0.1 and 5% of both N,N',N''-tri-n-butylmelamine and 2-hydroxy-4-methoxybenzophenone.

6. Rigid poly(vinyl chloride) of claim 1 stabilized against the deteriorating effects of light by having incorporated therein between 0.1 and 5.0% of both N,N-diallylmelamine and 2-hydroxy-4-methoxybenzophenone.

7. Rigid poly(vinyl chloride) of claim 1 stabilized against the deteriorating effects of light by having incorporated therein between 0.1 and 5.0% of both N-allylmelamine and 2-hydroxy-4-methoxybenzophenone.

8. Rigid poly(vinyl chloride) of claim 1 stabilized against the deteriorating effects of light by having incorporated therein between 0.1 and 5.0% of both N,N'-dimethylmelamine and 2-(2-hydroxy-5-methylphenyl)-benzotriazole.

9. Rigid poly(vinyl chloride) of claim 1 stabilized against the deteriorating effects of light by having incorporated therein between 0.1 and 5.0% of both N,N'-dimethylmelamine and 2-hydroxy-4-methoxybenzophenone.

10. Rigid poly(vinyl chloride) of claim 1 stabilized against the deteriorating effects of light by having incorporated therein between 0.1 and 5.0% of both hexamethylmelamine and 2-hydroxy-4-methoxybenzophenone.

References Cited

UNITED STATES PATENTS 2,648,650  8/1953  Weinberg _____ 260—45.75 XR

DONALD E. CZAJA, Primary Examiner

M. J. WELSH, Assistant Examiner

U.S. Cl. X.R.

260—45.75, 45.85, 45.9, 45.95